US009553682B2

(12) United States Patent
Bergljung et al.

(10) Patent No.: US 9,553,682 B2
(45) Date of Patent: Jan. 24, 2017

(54) SELECTIVITY TEST

(71) Applicant: Telefonaktiebolaget L M Ericsson (publ), Stockholm (SE)

(72) Inventors: Christian Bergljung, Lund (SE); Jan Curt Gustaf Celander, Malmo (SE); Peter Jakobsson, Lund (SE); Henrik Jeppsson, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/419,343

(22) PCT Filed: Aug. 5, 2013

(86) PCT No.: PCT/EP2013/066350
§ 371 (c)(1),
(2) Date: Feb. 3, 2015

(87) PCT Pub. No.: WO2014/023678
PCT Pub. Date: Feb. 13, 2014

(65) Prior Publication Data
US 2016/0013874 A1 Jan. 14, 2016

Related U.S. Application Data

(60) Provisional application No. 61/679,848, filed on Aug. 6, 2012.

(51) Int. Cl.
*H04L 1/00* (2006.01)
*H04B 17/29* (2015.01)
(Continued)

(52) U.S. Cl.
CPC .......... *H04B 17/29* (2015.01); *H04B 17/0085* (2013.01); *H04B 17/354* (2015.01); *H04W 24/06* (2013.01)

(58) Field of Classification Search
CPC ............ H04B 3/23; H04B 3/24; H04W 24/00; H04W 24/01; H04W 24/02; H04W 24/03; H04W 24/04
(Continued)

(56) References Cited

U.S. PATENT DOCUMENTS 6,418,162 B1* 7/2002 Yau .......................... H03J 7/32
375/224
2013/0182753 A1* 7/2013 Delforce ............ H04B 17/0085
375/228

OTHER PUBLICATIONS

PCT International Search Report, mailed Sep. 23, 2013, in connection with International Application No. PCT/EP2013/066350, all pages.
(Continued)

*Primary Examiner* — Dady Chery
(74) *Attorney, Agent, or Firm* — Leffler Intellectual Property Law, PLLC

(57) ABSTRACT

Testing radio equipment is described wherein an interfering signal is swept in frequency with a step size that is chosen proportional to the bandwidth of the receive channel of the radio equipment. For example, a respective frequency bandwidth ($B_{Ch}$) is determined of a plurality of receive channels of the radio equipment. A proportionality constant is selected for a frequency step size. For each respective receive channel, interfering radio signals are generated and the interfering radio signals are controlled to stepwise sweep in frequency outside of each respective receive channel. The stepwise sweeping of the interfering frequency is performed with a frequency step size that is a product of the respective bandwidth and the selected proportionality constant. Any spurious response is detected in the respective receive channel.

7 Claims, 4 Drawing Sheets

(51) Int. Cl.
*H04B 17/00* (2015.01)
*H04W 24/06* (2009.01)
*H04B 17/354* (2015.01)

(58) Field of Classification Search
USPC  370/252, 286, 289, 302, 477, 480; 375/224,
295, 307, 297
See application file for complete search history.

(56) References Cited

OTHER PUBLICATIONS

PCT Written Opinion, mailed Sep. 23, 2013, in connection with International Application No. PCT/EP2013/066350, all pages.
Anritsu Rx Test cases Uplink power limit window for 3000Mhz to 4200Mhz 3GPP Draft R5-120244 3.5GHz UL Power Window for Rx Tests, 3rd Generation Partnership Project, Sophia-Antipolis, Cedex, France, RAN WG5, Dresden, Germany, Feb. 6, 2012-Feb. 10, 2012, Jan. 25, 2012, XP050570382, pp. 15-18.
Australian Patent Examination Report No. 2, issued Jan. 29, 2016, in connection with Australian Application No. 2013301581, all pages.
Anritsu: MG3700A—Vector Signal Generator—250 kHz to 3 GHz, 250kHz to 6GHz (option), Product Brochure, Catalog No. MG3700A-E-A-1-(13.00) May 18, 2011, retrieved from internet on Jan. 28, 2016, 28 pages.

* cited by examiner

SELECTIVITY TEST

CROSS-REFERENCE TO RELATED APPLICATIONS

This application claims the benefit of U.S. Provisional Application No. 61/679,848, filed Aug. 6, 2012, which is hereby incorporated herein by reference in its entirety.

TECHNICAL FIELD

The field of the present disclosure is that of controlling verification of radio requirements to be met by radio equipment such as a receiver or transceiver in a cellular communication system.

BACKGROUND

Out-of-band blocking, OOBB, is a measure of the ability of a radio device to suppress strong interferer signals outside the receive band of the device. Most radio performance requirements and specifications include OOBB requirements. Verification of these requirements is a time consuming and therefore costly process.

For a radio receiver supporting duplex communications, the selectivity (adjacent channel, in-band and out-of-band blocking) of the receive path is tested with the own transmitter at high power. The receiver path must be able to:
1. reject a strong external interferer outside the receive frequency band without receiver saturation, and
2. reject the said external interferer in the presence of another strong signal (the own transmitter) at a frequency different from the external interferer.

Firstly, the receiver may be saturated (blocked) or suffer degraded performance in the presence of a strong interferer. Secondly, intermodulation between the external interferer and other signals internal to the radio device under test, e.g. the own transmitter, may create intermodulation products that fall within the receiver channel. The intermodulation is caused by nonlinearities in the receiver (or transceiver).

FIGS. 1 and 2 depict two interferer scenarios for out-of-band blocking tests. FIG. 1 shows the external interferer at a certain frequency separation, $F_{separation}$, from the receive channel (cross-hatched area) assigned in a certain operating band (un-hatched area). The receiver must be able to withstand a larger interferer power as the frequency separation to the receive channel increases; a measure of the receiver selectivity.

FIG. 2 shows a scenario in which the external interferer and the own transmitter (striped area) generate an intermodulation product (solid black area) that falls within the receiver channel. Then a spurious response is generated. As the skilled person will realize, a spurious response is a measure of the receiver's ability to receive a wanted signal on its assigned channel frequency without exceeding a given degradation due to the presence of an unwanted continuous wave, CW, interfering signal at any other frequency at which a response is obtained, i.e. for which a specified out of band blocking limit is not met.

In this case, this occurs when the separation between the external interferer and the own transmitter is equal to the frequency separation between the own transmitter and receiver: FDuplex (a so called double-duplex interferer). The magnitude of the intermodulation product generating the spurious response depends on the power levels of the external interference and the own transmitter.

An out-of-band blocking (selectivity) test is carried out with the own transmitter at a specified power, typically close to the maximum output power of the radio device tested, and a given wanted signal level close to the minimum power level of the receiver. This means that a larger external interferer power can be tolerated when (a) spurious responses are not generated and when (b) the frequency separation between the external interferer and the receive channel increases. FIG. 3 shows a case where a spurious response is not generated: the receiver can then tolerate a higher external interference power since the wanted signal is not degraded by the intermodulation product.

Spurious responses can also be generated by intermodulation with other internal signals such as harmonics of the local oscillator. During a selectivity test, it is important that the external interference is swept in frequency over a large range, typically from the order of 20 kHz to 10 GHz for commercial radio equipment. The spurious responses generated by various internal signals should be covered. In practice the interferer is stepped in frequency to cover the frequency range, and the test time required is essentially inversely proportional to the step size.

The test time due to capture spurious response and a large frequency range is very long given typical step sizes used. This is exacerbated if the radio device supports features like carrier aggregation (for the air interface of universal terrestrial radio access, UTRA, systems and evolved universal terrestrial radio access, E-UTRA, systems) when several combinations of transmitter- and receive channels must be tested (performed in sequence). For example, when testing E-UTRA (long term evolution, LTE) radio equipment, the step size currently is 1 MHz and the out-of-band blocking tests requires around 8 hours for completion.

SUMMARY

With the above in mind it is of interest to identify conditions under which the step size in frequency can be reduced while still meeting the purpose of the selectivity test and thereby reduce the test time (and hence cost).

According to a first aspect there is provided a method for testing radio equipment wherein an interfering signal is swept in frequency with a step size that is chosen proportional to the bandwidth of the receive channel of the radio equipment.

More specifically, the method of the first aspect can, in some embodiments, comprise determining a respective frequency bandwidth ($B_{Ch}$) of a plurality of receive channels of the radio equipment. A proportionality constant is selected for a frequency step size. For each respective receive channel, interfering radio signals are generated and the interfering radio signals are controlled to stepwise sweep in frequency outside of each respective receive channel. The stepwise sweeping of the interfering frequency is performed with a frequency step size that is a product of the respective bandwidth and the selected proportionality constant. Any spurious response is detected in the respective receive channel.

In a second aspect there is provided test equipment in the form of an apparatus for testing radio equipment comprising radio frequency, RF, circuitry, control circuitry and memory circuitry configured to sweep an interfering signal in frequency with a step size that is chosen proportional to the bandwidth of the receive channel of the radio equipment.

More specifically, the apparatus of the second aspect can, in some embodiments, comprise RF circuitry, control circuitry and memory circuitry that are configured to:

determine a respective frequency bandwidth ($B_{Ch}$) of a plurality of receive channels of the radio equipment, select a proportionality constant for a frequency step size, generate, for each respective receive channel, interfering radio signals and control the interfering radio signals to stepwise sweep in frequency outside of each respective receive channel, where the stepwise sweeping of the interfering frequency is performed with a frequency step size that is a product of the respective bandwidth and the selected proportionality constant, and detect any spurious response in the respective receive channel.

In a third aspect there is provided a computer program product comprising software instructions that are configured, when executed in a processing device, to perform the method of the first aspect.

These methods, arrangements and computer program products provide an advantage over prior art solutions in that the test times are significantly reduced and enable measuring the frequency response of the receiver selectivity while not missing any spurious response.

DETAILED DESCRIPTION OF EMBODIMENTS

Figure 1:
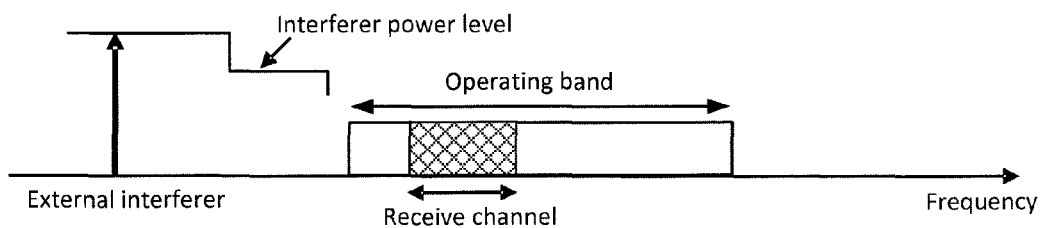
FIGS. 1, 2, 3, 4a and 4b illustrate schematically frequency bands and signal powers.
Figure 2:
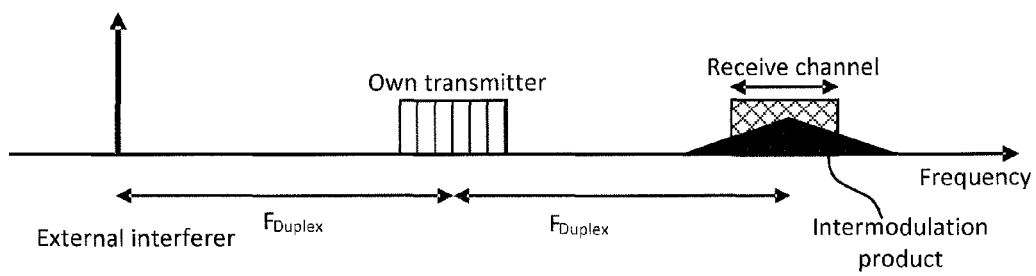
Figure 3:
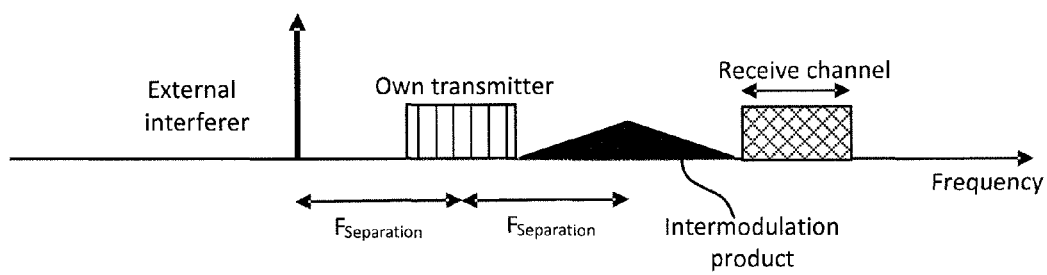
Figure 4A:
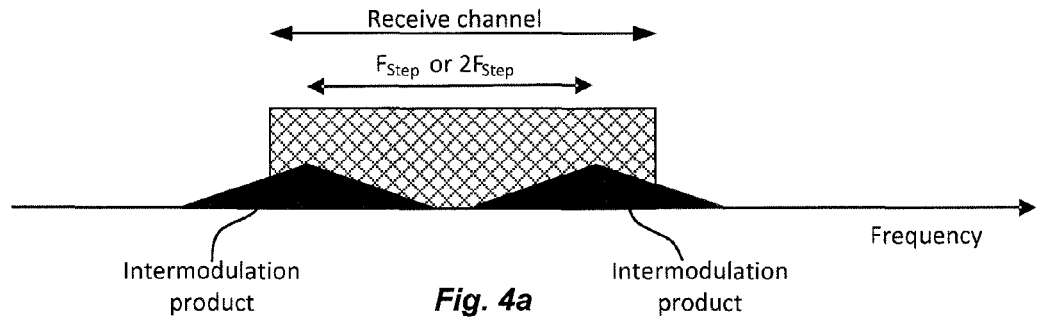
Figure 4B:
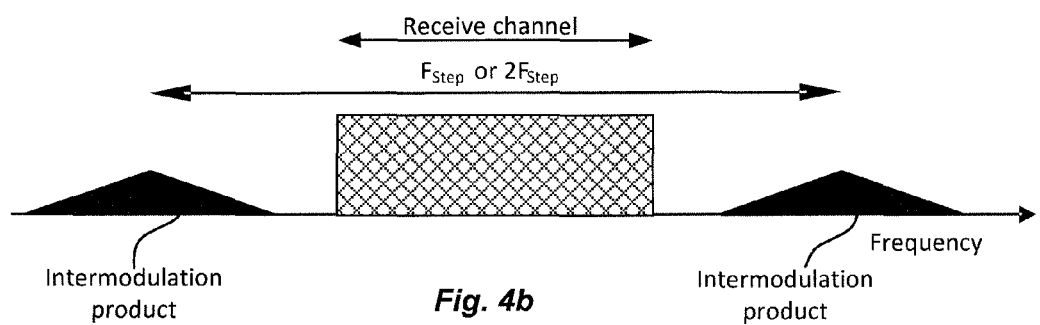
Figure 5:
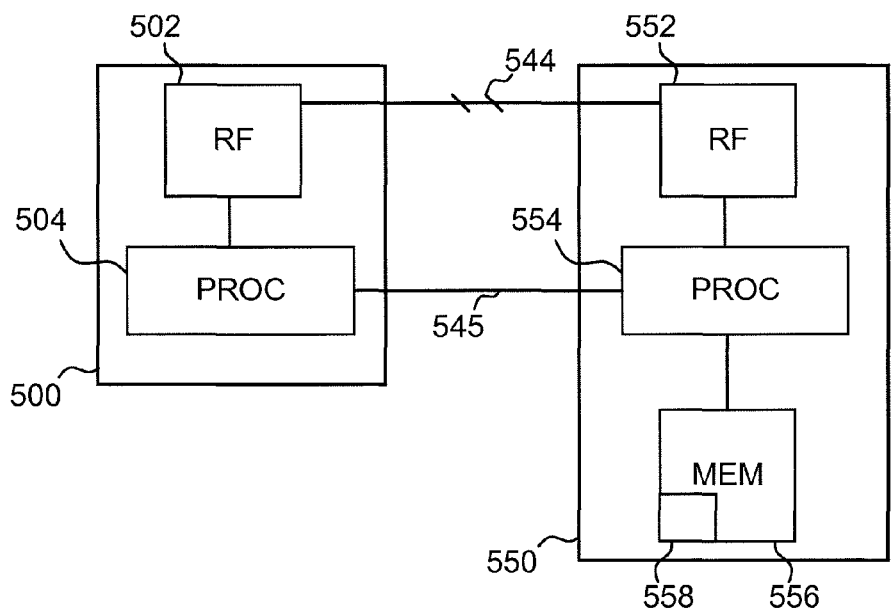
FIG. 5 illustrates schematically a radio device and test equipment.

Turning now to FIGS. 4, 5 and 6, OOBB testing will be described in terms of an exemplifying test equipment, method and software for executing such a method.

According to an exemplifying method, and as illustrated in FIGS. 4a and 4b, the intermodulation product generating a spurious response is traversing the receive channel as the interferer frequency is swept. A spurious response is generated for each frequency step of the external interference for which the intermodulation product falls in the receive channel, as illustrated in FIG. 4a. The intermodulation product is moved either by one or two steps, $F_{Step}$, for the lowest order nonlinearities of the receiver per frequency step of the external interferer. The step size could be chosen proportional to the bandwidth of the receive channel. It is desirable to choose the step size:

as large as possible to minimize test time but not too large such that a spurious response may not be captured within the receive channel band and the frequency response of the receiver selectivity is not adequately measured, which is illustrated in FIG. 4b.

The step size is chosen in proportion to the receive channel bandwidth under test so that the test time is reduced while still meeting the purpose of the test.

FIG. 5 illustrates a radio device 500 in the form of a transceiver that is configured for OOBB testing by test equipment 550. The radio device 500 is capable of duplex transmission. The device 500 comprises a radio frequency, RF, receiver 502 that may support one or several channel bandwidths.

The test equipment 550 is capable of generating an external interferer, i.e. an interfering radio signal, that is controlled by a controller 554 in cooperation with RF circuitry 552. Software 558 resides in a memory 556 and controls the testing as will be described below. The software 558 can be provided to the equipment 550 by means of a non-transitory computer program product that is realized on any suitable software carrier such as a disc or flash memory etc. A radio frequency connection 544 is used to convey the generated interferer from the test equipment 550 to the receiver. The connection can be an air interface as well as a galvanic, capacitive or inductive connection. A processing unit 504 in the device 500 is configured to report, via a connection 545, responses from the radio frequency receiver 502 to the test equipment 550.

The interferer is swept in frequency using a preselected step size. The interferer is not swept across the receive channel (e.g. out-of-band or in-band blocking test, the latter still excludes the actual receive channel).

The step size is chosen proportional to the bandwidth of the receive channel $B_{ch}$ with a step size less than or equal to $B_{ch}/2$ so that a frequency step makes sure any spurious response due to internal signals in the radio device 500 is captured (the spurious response can move by two steps so $F_{Step} < B_{ch}/2$). The external interferer is swept using the said frequency step and the selectivity and spurious responses are recorded. The step size may be chosen slightly larger, $B_{ch}/2 < F_{Step} < B_{ch}$, but at a possible penalty of test accuracy.

Figure 6A:
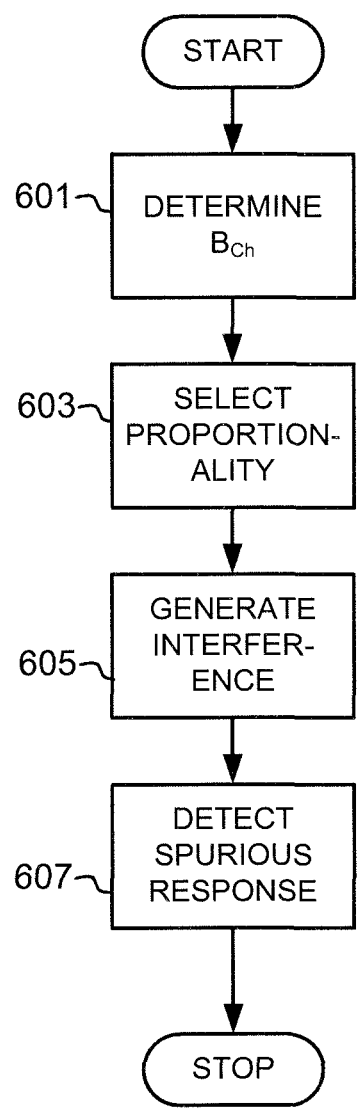
FIGS. 6a and 6b are flow charts of methods for testing selectivity.
Figure 6B:
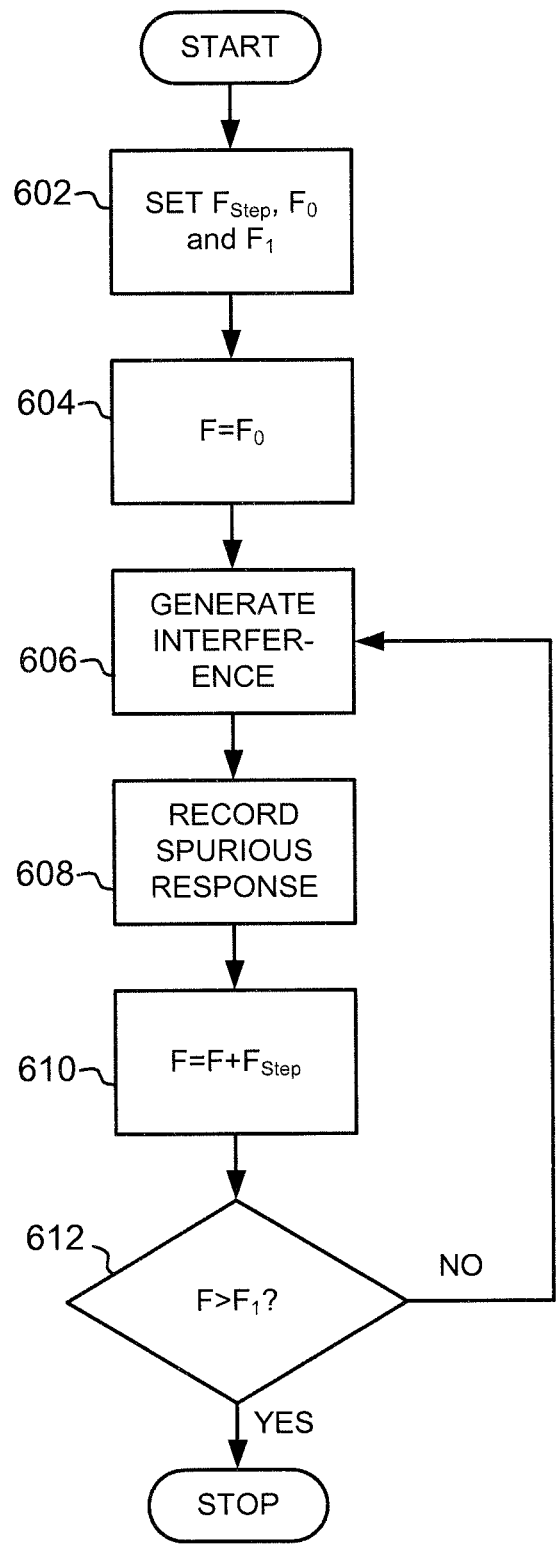

FIGS. 6a and 6b are flow charts of examples of such a method. FIG. 6a illustrates a more general realization of a test method and FIG. 6b is a more specific example. The method in FIG. 6a commences with a determination step 601 where a respective frequency bandwidth ($B_{Ch}$) of a plurality of receive channels of the radio equipment is determined. A proportionality constant is selected, in a selection step 603, for a frequency step size. For each respective receive channel, interfering radio signals are generated in a generation step 605. The generation step involves controlling the interfering radio signals to stepwise sweep in frequency outside of each respective receive channel, where the stepwise sweeping of the interfering frequency is performed with a frequency step size that is a product of the respective bandwidth and the selected proportionality constant.

Any spurious response is detected in the respective receive channel in a detection step 607.

A more detailed example of such a test method is illustrated in FIG. 6b. The method of FIG. 6b commences with a setting step 602 where the frequency step $F_{Step}$ (selected as above), a starting frequency $F_0$ and an end frequency $F_1$ for the sweeping are set.

The frequency of the interferer, i.e. the interfering signal, F is then set to the starting frequency $F_0$ in a setting step 604.

The interfering signal at frequency F is then generated and provided to the receiver 500 in a generating step 606.

The interfering signal is received in the RF receiver 502 of the device 500 and spurious responses are provided by the processing unit 504 via the connection 545 and recorded, in a recording step 608, in the test equipment 550.

The sweeping then continues by incrementing, in a setting step 610, the frequency F of the interferer by $F_{Step}$.

If the frequency F is not higher than $F_1$, as checked in a checking step 612, an interfering signal at the new frequency F is generated and provided as illustrated by returning to the generating step 606.

Results show that the test time for selectivity test can be significantly reduced using these embodiments. Picking E-UTRA (LTE) as an example, the step size that is currently used in testing procedures is 1 MHz and the out-of-band blocking tests requires around 8 hours for completion. The bandwidths supported are up to 20 MHz. A choice of step size as:

$$F_{Step}=\max\{1,\min(\lfloor 0.5BW_{Channel}\rfloor,5)\} \text{ in MHz between 1 and 5 MHz)} \quad \text{(Equation 1)}$$

can reduce the test time by a factor of 5. The function $\lfloor x \rfloor$ is the floor function, which returns the largest integer not greater than x. The following table illustrates the frequency step sizes obtained by using equation 1.

| Channel Bandwidth [MHz] | Step size [MHz] |
|---|---|
| 1.4 | 1 |
| 3 | 1 |
| 5 | 2 |
| 10 | 5 |
| 15 | 5 |
| 20 | 5 |

The bandwidth can be up to 20 MHz. The upper limit of 5 MHz is chosen here to be able to record the frequency selectivity with sufficient frequency granularity. The number of allowed spurious responses for E-UTRA is also reduced, inversely proportional to the step size employed.

For E-UTRA carrier aggregation (with several combinations of receive channel configurations to be tested) it is crucial to limit the test time of the out-of-band blocking test in order to save test time and thus development costs.

In the above, intermodulation has been used as an example of an effect that causes spurious responses. However, it shall be noted that spurious responses can also be generated by other components such as harmonics.

The invention claimed is:

1. A method for testing radio equipment comprising:
   generating an interfering signal;
   determining a respective frequency bandwidth ($B_{Ch}$) of a plurality of receive channels of the radio equipment;
   selecting a proportionality constant for a frequency step size for each respective receive channel;
   generating, for each respective receive channel, interfering radio signals and controlling the interfering radio signals to stepwise sweep in frequency outside of each respective receive channel, where the stepwise sweeping of the interfering frequency is performed with the respective frequency step size that is a product of the respective bandwidth and the selected proportionality constant; and
   detecting any spurious response in the respective receive channel.

2. The method of claim 1 wherein the selection of the proportionality constant for a frequency step size comprises selecting a value that is less than or equal to ½.

3. The method of claim 1, wherein the selection of the proportionality constant for a frequency step size comprises selecting a value that is in an interval defined by the expression: $\max\{S_0,\min(\lfloor 0.5B_{Ch}\rfloor,S_1)\}$, where $S_0$ is 1 MHz and $S_1$ is 5 MHz and the function $\lfloor \ldots \rfloor$ is the floor function, and $B_{CH}$ ranges from 1.4 to 20 MHz.

4. An apparatus for testing radio equipment, the apparatus comprising:
   radio frequency (RF) circuitry;
   control circuitry; and
   memory circuitry,
   wherein the RF circuitry, control circuity, and memory circuitry are configured to generate an interfering signal, and
   wherein the RF circuitry, control circuitry and the memory circuitry are configured to:
   determine a respective frequency bandwidth ($B_{Ch}$) of a plurality of receive channels of the radio equipment;
   select a proportionality constant for a frequency step size for each respective receive channel;
   generate, for each respective receive channel, interfering radio signals and control the interfering radio signals to stepwise sweep in frequency outside of each respective receive channel, where the stepwise sweeping of the interfering frequency is performed with the respective frequency step size that is a product of the respective bandwidth and the selected proportionality constant; and
   detect any spurious response in the respective receive channel.

5. The apparatus of claim 4, wherein the configuration of the RF circuitry, control circuitry and the memory circuitry to select the proportionality constant for a frequency step size comprises a configuration to select a value that is less than or equal to ½.

6. The apparatus of claim 4, wherein the configuration of the RF circuitry, control circuitry and the memory circuitry to select the proportionality constant for a frequency step size comprises a configuration to select a value that is in an interval defined by the expression: $\max\{S_0,\min(\lfloor 0.5B_{Ch}\rfloor,S_1)\}$, where $S_0$ is 1 MHz and $S_1$ is 5 MHz and the function $\lfloor \ldots \rfloor$ is the floor function, and $B_{CH}$ ranges from 1.4 to 20 MHz.

7. A non-transitory processor readable storage medium comprising software instructions that, when executed in a processor, perform a method for testing radio equipment, the method comprising:
   generating an interfering signal;
   determining a respective frequency bandwidth ($B_{Ch}$) of a plurality of receive channels of the radio equipment;
   selecting a proportionality constant for a frequency step size for each respective receive channel;
   generating, for each respective receive channel, interfering radio signals and controlling the interfering radio signals to stepwise sweep in frequency outside of each respective receive channel, where the stepwise sweeping of the interfering frequency is performed with the respective frequency step size that is a product of the respective bandwidth and the selected proportionality constant; and
   detecting any spurious response in the respective receive channel.

* * * * *

UNITED STATES PATENT AND TRADEMARK OFFICE
CERTIFICATE OF CORRECTION

PATENT NO. : 9,553,682 B2
APPLICATION NO. : 14/419343
DATED : January 24, 2017
INVENTOR(S) : Bergljung et al.

Page 1 of 1

It is certified that error appears in the above-identified patent and that said Letters Patent is hereby corrected as shown below:

In the Specification

In Column 2, Line 17, delete "of 20" and insert -- of --, therefor.

In Column 4, Line 50, delete "receiver 500" and insert -- receiver 502 --, therefor.

In Column 5, Line 2, delete "between" and insert -- (between --, therefor.

Signed and Sealed this
Twelfth Day of September, 2017

Joseph Matal
*Performing the Functions and Duties of the
Under Secretary of Commerce for Intellectual Property and
Director of the United States Patent and Trademark Office*